United States Patent [19]
Modavis et al.

[11] Patent Number: 5,455,879
[45] Date of Patent: Oct. 3, 1995

[54] ANAMORPHIC MICROLENS FOR COUPLING OPTICAL FIBERS TO ELLIPTICAL LIGHT BEAMS

[75] Inventors: Robert A. Modavis, Painted Post; Thomas W. Webb, Horseheads, both of N.Y.

[73] Assignee: Corning Incorporated, Corning, N.Y.

[21] Appl. No.: 263,809

[22] Filed: Jun. 22, 1994

[51] Int. Cl.$^6$ .................................. G02B 6/00; G02B 6/32
[52] U.S. Cl. .................................... 385/33; 385/15
[58] Field of Search ........................... 385/15, 30, 31, 385/32, 33

[56] References Cited

U.S. PATENT DOCUMENTS

| | | | |
|---|---|---|---|
| 4,143,940 | 3/1979 | Khoe | 385/31 |
| 4,370,021 | 1/1983 | Khoe et al. | 385/31 |
| 4,490,020 | 12/1984 | Sakaguchi et al. | 385/33 |
| 4,705,351 | 11/1987 | Toda | 385/33 |
| 4,763,975 | 8/1988 | Scifres et al. | 385/31 |
| 5,011,254 | 4/1991 | Edwards et al. | 385/31 |
| 5,200,024 | 4/1993 | Blonder et al. | 156/628 |
| 5,256,851 | 10/1993 | Presby | 385/33 X |
| 5,265,177 | 11/1993 | Cho et al. | 385/31 X |

FOREIGN PATENT DOCUMENTS 0558230  9/1993  European Pat. Off. .

OTHER PUBLICATIONS

"Efficient Power Coupling from a 980–nm Broad–Area Laser to a Single–Mode Fiber Using a Wedge–Shaped Fiber Endface" by Journal of Lightwave Tech. vol. 8, No. 9, Sep. 1990, pp. 1313–1318.

"Peaked Fiber Ends Result in Increased Coupling Efficiency" Laser Focus, Feb., 1982, p. 103.

Hunziker et al. "Elliptically Lensed Polarization Maintaining Fibers", Electronics Letters, 13th Aug. 1992, vol. 28, No. 17, pp. 1654–1656.

Primary Examiner—Akm E. Ullah
Attorney, Agent, or Firm—William J. Simmons, Jr

[57] ABSTRACT

To couple the elliptical mode field light beam of a laser radiation source to a circularly symmetric single-mode optical fiber, the end of the fiber is provided with an anamorphic lens. The double wedge-shaped lens provides high coupling efficiency and is easily constructed. Other anamorphic lenses are also disclosed. A single wedge lens can provide high coupling efficiency if it is formed on the end of a coupling fiber which has a core that is elliptically-shaped in cross-section, the line of intersection of the two surfaces forming the lens being aligned with the major axis of the elliptical fiber core.

9 Claims, 2 Drawing Sheets

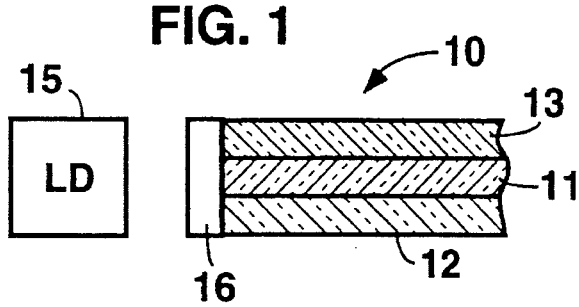
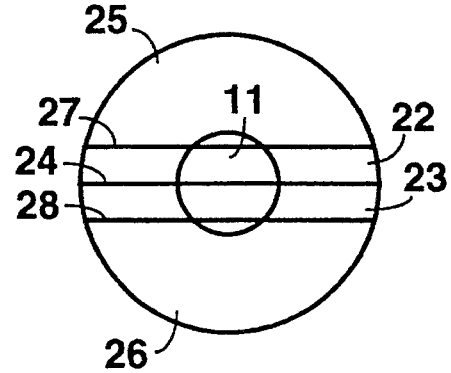
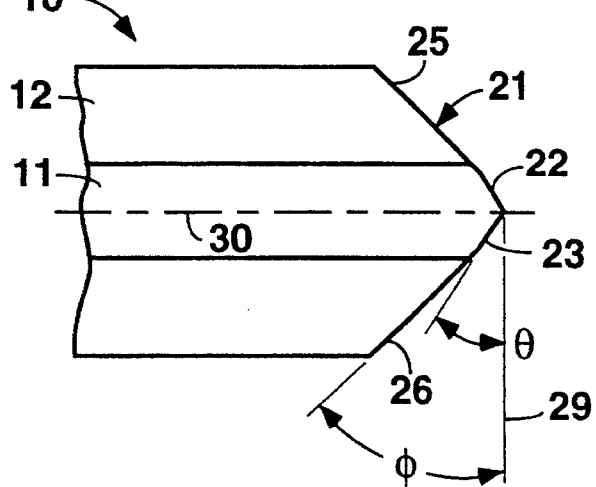
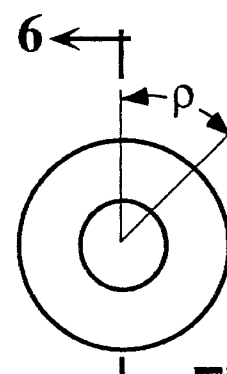
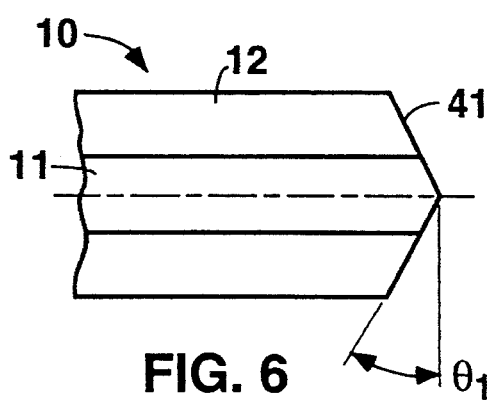
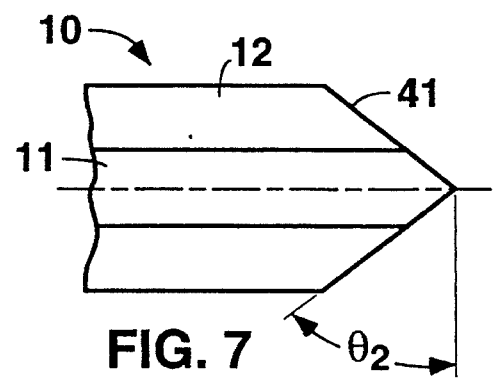

ANAMORPHIC MICROLENS FOR COUPLING OPTICAL FIBERS TO ELLIPTICAL LIGHT BEAMS

CROSS-REFERENCE TO RELATED APPLICATION

This invention is related to the invention disclosed in U.S. patent application Ser. No. 08/148,291, now U.S. Pat. No. 5,351,323, "Optical Fiber for Coupling to Elliptically-Shaped Source" filed Nov. 8, 1993 (Miller et al.).

BACKGROUND OF THE INVENTION

The present invention relates to microlenses formed on the ends of optical fibers for coupling sources of elliptically-shaped radiation such as laser diodes to conventional circularly symmetric single-mode optical fibers.

Microlenses formed on the ends of optical fibers are employed to couple light from sources such as laser diodes to the fiber. Typical 980 nm laser diodes emit a beam having an aspect ratio between 2.5:1 and 4:1. The coupling efficiency between such laser diodes and conventional single-mode fibers is affected by the aspect ratio of the radiating area of the diodes. A coupling loss is induced since the elliptically shaped laser mode must be transformed into an appropriately sized, circularly symmetric fiber mode. Therefore, a meaningful comparison between the efficiencies of different shapes of fiber microlenses can be made only by assuming the same type light source. Coupling efficiency is also affected by fiber-laser alignment. It is therefore judicious to compare the coupling efficiencies of fiber lenses by computer modeling techniques that assume perfect alignment of each lens shape analyzed. Efficiencies expressed herein are based on a computer modeling technique that is similar to that disclosed in U.S. Pat. No. 5,011,254 in that both modeling techniques perform overlap integrals to determine the coupling. The technique employed for the lenses disclosed herein assumes a light beam aspect ratio of 2.45 µm×0.71 µm, an optical fiber mode field of 2.0 µm and a wavelength of 980 nm.

Rotationally symmetric lenses have been used for efficiently connecting sources with essentially circular light beams to circularly symmetric single-mode optical fibers. One such scheme for coupling light from a light beam having an aspect ratio of 1.1:1 has been reported to provide a coupling efficiency of 90%. However, for typical laser diodes (aspect ratio of about 3.5:1) the maximum coupling efficiency to a circularly symmetric lensed fiber is about 65–70%. The aforementioned computer modeling technique predicted an efficiency of 69% for a single cone lens.

The double-conical lens (shallow slope at fiber core and steeper slope at fiber cladding) disclosed in U.S. Pat. No. 5,200,024 is said to provide a relatively broad range of coupling efficiencies between 65% and 80%. The aforementioned computer modeling technique predicted an efficiency of 71% for the optimum rotationally symmetric lens. Thus, a theoretical improvement in coupling efficiency of no more than about 2% can be expected by employing a double cone lens rather than a single cone lens. Because of the increased difficulty of making the double cone lens, it may not be practical to employ a lens of such a design to achieve an increase in coupling efficiency of only up to about 2%.

Anamorphic (circularly nonsymmetric) lenses provide more efficient coupling between laser diodes and circularly symmetric single-mode fibers. For example, a wedge-shaped lens (wedge angle θ=25°) exhibiting a measured coupling efficiency of 47% is disclosed in the publication S. S. Virendra et al. "Efficient Power Coupling from a 980-nm Broad-Area Laser to a Single-Mode Fiber Using a Wedge-Shaped Fiber Endface", Journal of Lightwave Technology, vol. 8, No. 9, September 1990, pp. 1313–1318. The angle θ is the angle made by the intersection of a wedge face with a plane perpendicular to the fiber longitudinal axis. The aforementioned computer modeling technique predicts an efficiency of 89.2%.

Asymmetrical hyperbolic microlenses have been formed on the ends of optical fibers by a laser machining technique. Coupling efficiencies of −0.75 dB (about 84%) have been reported with lasers operating at a wavelength of 980 nm and having an approximately 3:1 beam ellipticity. Such lenses are very difficult to fabricate.

SUMMARY OF THE INVENTION

It is an object of the present invention to provide an improved optical fiber microlens for coupling light from a source such as a laser having an elliptical mode field to an optical fiber having a circular mode field. Another object is to provide an easily fabricated, highly efficient optical fiber microlens. A further object is to provide an optical coupling system that will overcome the heretofore noted disadvantages of prior art devices.

Briefly, the present invention relates to the coupling light of from a radiation source to a circularly symmetric fiber. One embodiment concerns an optical fiber microlens comprising a single-mode optical fiber having a core and a cladding. A wedge-shaped microlens is formed on one end of the fiber, the microlens including a first pair of surfaces that intersect at a line that substantially bisects the fiber core. The microlens further includes a second pair of surfaces that intersect the first pair of surfaces. The slopes of the first and second pairs of surfaces is θ and φ, wherein φ is greater than θ, the slopes of the first and second pairs of surfaces being measured with respect to a plane perpendicular to the longitudinal fiber axis. The second pair of surfaces preferably intersect the first pair of surfaces at lines that intersect the core.

In another embodiment, the microlens comprises a single-mode optical fiber having a core and a cladding, a cone-shaped microlens being formed on one end thereof. The microlens exhibits a first cone angle $\theta_1$ in a first plane through the axis, and a second cone angle $\theta_2$ in a second plane through the axis and perpendicular to the first plane. The cone angles are measured with respect to a plane passing through the end of the lens and perpendicular to the longitudinal fiber axis. That portion of the lens at which the cone angle is $\theta_1$ is located at an azimuthal angle ρ=0°, the cone angle changing monotonically from $\theta_1$ to $\theta_2$ as the azimuthal angle ρ changes from 0° to 90°. The cone angle changes monotonically from $\theta_2$ to $\theta_1$ as the azimuthal angle ρ is changed from 90° to 180°. The cross-section of the lens is symmetrical with respect to the longitudinal fiber axis as viewed in any plane passing through that axis.

In a further embodiment the optical fiber microlens comprises an optical fiber having a core and a cladding, the cross-section of the core in a plane perpendicular to the fiber axis being an ellipse having a major and a minor axis. A wedge-shaped microlens that is situated on one end of the fiber includes a first pair of surfaces that intersect at a line that substantially bisects the fiber core and lies on the major axis of the fiber.

If the microlens is formed on an optical fiber having an elliptically-shaped core, the end of the elliptical mode fiber opposite that having the microlens can be provided with means for coupling a signal propagating in the elliptical mode fiber to a circularly symmetric single-mode fiber.

BRIEF DESCRIPTION OF THE DRAWINGS

FIG. 1 is a schematic illustration of a system employing an anamorphic lens formed in accordance with the present invention.

FIG. 2 is a schematic illustration of a dual wedge anamorphic microlens.

FIG. 3 is an end view of the lens of FIG. 2.

FIG. 5 is an end view of another anamorphic lens.

FIG. 6 is a schematic illustration of a cross-section taken along lines 6—6 of FIG. 5.

FIG. 7 is a further schematic illustration of the lens of FIGS. 5 and 6 as viewed in an axial plane oriented 90° from the plane of the view of FIG. 6.

DESCRIPTION OF THE PREFERRED EMBODIMENTS

Figure 4:
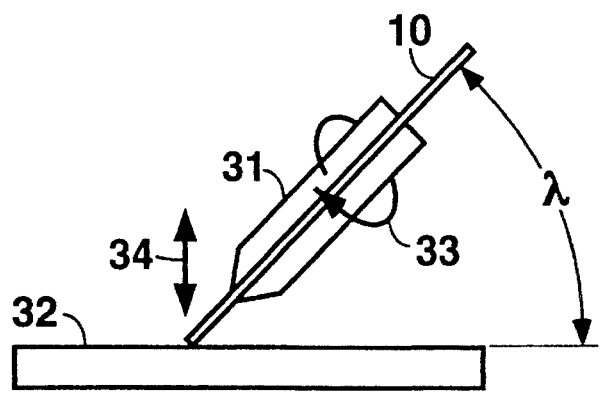
FIG. 4 illustrates apparatus for forming the anamorphic lenses of the present invention.

FIG. 1 shows an optical fiber 10, an end 13 of which is positioned in light receiving relationship with respect to laser diode 15. Fiber 10 has a circularly symmetrical core 11, and a cladding 12. End 13 is provided with anamorphic lens means 16 to facilitate the capture of light by core 11 and to direct away from the laser facet any light that reflects from the fiber endface. Anamorphic lens means 16, which is formed integrally with fiber 10, may be located about 3–6 μm from the laser diode.

FIGS. 2 and 3 show an embodiment in which lens means 16 consists of a wedge-shaped fiber microlens 21 on one end of fiber 10. The microlens includes a first pair of surfaces 22 and 23 that intersect at a line 24 that substantially bisects core 11. The microlens further includes surfaces 25 and 26 that intersect surfaces 22 and 23, respectively, at lines 27 and 28, respectively. The slopes of surfaces 22 and 23 are θ and the slopes of surfaces 25 and 26 are ϕ, wherein ϕ is greater than θ. The angles θ and ϕ are measured with respect to a plane 29 perpendicular to fiber axis 30. Lines 27 and 28 of intersection of the first and second pairs of surfaces preferably intersect the core as shown in FIG. 3. Moreover, the area of surface 22 is preferably substantially equal to the area of surface 23. In other words, the central portion of lens 21 is preferably symmetrical about a plane containing axis 27 and line 24.

A fiber was formed having a double wedge lens wherein wedge angles θ and ϕ were 15° and 44°, respectively. The "break point" (the region where the wedge angle changes) occurred within the core region 11 of fiber 10. That is, lines 27 and 28 intersected core 11. The resulting coupling efficiency was measured to be 78%. For comparison purposes, single wedge angle fiber lenses were fabricated having single wedge angles of 23° and 32°. The measured average coupled power is 65% with the 23° wedge and 68% with the 32° wedge. The double wedge design provides a significant improvement in coupling efficiency over the single wedge fiber lenses.

The calculated coupling efficiency of a double wedge lens is 96.2% (excluding reflecting loss). This compares favorably with a calculated coupling efficiency of 89.2% (excluding reflecting loss) for a single wedge lens.

Apparatus such as that taught in U.S. Pat. No. 4,818,263 and UK patent application GB 2184376 A can be used to form double wedge lenses. The basic requirements of an optical fiber grinder for forming microlenses are schematically illustrated in FIG. 4. Fiber 10 is restrained within a guide sleeve 31 so that the tip thereof can be positioned at the surface of grinding wheel 32. Fiber 10 can be rotated about its longitudinal axis as indicated by arrow 33, and it can be moved up or down in a direction perpendicular to grinding wheel 32 as indicated by arrow 34. The angle α with which the longitudinal axis of the fiber intersects the plane of the grinding wheel surface is adjustable.

Lens 21 was formed by first grinding surface 22 at angle θ on the tip of fiber 10 such that the peak of the wedge substantially bisects the fiber core. After the first surface of the wedge was formed, the fiber was elevated, rotated 180° and lowered so that surface 23 could be formed. The end of fiber 10 was then elevated with respect to the grinding wheel, and the angle α of sleeve 31 was changed so that wedge surfaces 25 and 26 could be ground at an angle ϕ.

The effective light focusing region of a fiber microlens is that central region of the fiber where most of the power propagates. The power decreases to almost zero at a radial distance of six mode field radii. The fiber endface could be further modified at radii greater than six mode field radii without substantially modifying or degrading the focusing effect of a microlens. However, the first and second pairs of surfaces preferably constitute the entire endface of the fiber.

In the anamorphic lens design of FIGS. 5, 6 and 7, lens means 16 consists of a quasi cone-shaped lens wherein the cone angle changes from $\theta_1$ to $\theta_2$ as the as the azimuthal angle ρ changes from 0° to 90°. The cone angle changes back from $\theta_2$ to $\theta_1$ as the azimuthal angle ρ is changed from 90° to 180°. A similar cone angle change occurs at values of azimuthal angle ρ between 180° and 360°. The change in cone angle can be linear or non-linear with respect to the azimuthal angle. Lens 41 differs from typical cone-shaped rotationally symmetric fiber lenses wherein the cone angle θ is the same for all azimuthal angles.

The anamorphic quasi cone-shaped lens was analyzed by the aforementioned computer modeling technique, the laser and fiber mode fields and wavelength being as defined above. It was assumed that the change in cone angle is linear with respect to the azimuthal angle. Coupling efficiency was calculated to be 90% (excluding reflecting loss) for an anamorphic lens in which $\theta_1$ is 5° and $\theta_2$ is 31°. With the same source, fiber and wavelength parameters and an optimized rotationally symmetric lens, the theoretical coupling efficiency is 69% for a cone angle θ of 14°. It can be seen that a dramatic increase in coupling can be obtained by employing an anamorphic cone shaped lens rather than a rotationally symmetric conical lens.

The anamorphic fiber lens design of this embodiment is relatively easy to produce with the equipment schematically represented in FIG. 3. Guide sleeve 31 is lowered (arrow 34) to cause fiber 10 to engage grinding wheel 32. Angle α is adjusted to cause the fiber endface to be ground at an angle $\theta_1$. As the fiber is rotated (arrow 33) angle α is simultaneously changed linearly with respect to fiber rotation so that by the time that the fiber has rotated 90°, the angle α has been decreased so that a cone angle of $\theta_2$ is being ground on the fiber endface. During the subsequent 90° rotation of fiber 10, angle α is changed linearly with respect to the angle of rotation of the fiber until the fiber endface is again being ground at a cone angle of $\theta_1$. A similar change in angle α is again effected as fiber 10 is rotated between 180° and 360°. Therefore, the cross-section of the lens is symmetrical with respect to the longitudinal axis of the fiber as viewed in any plane passing through the fiber axis.

Figure 8:
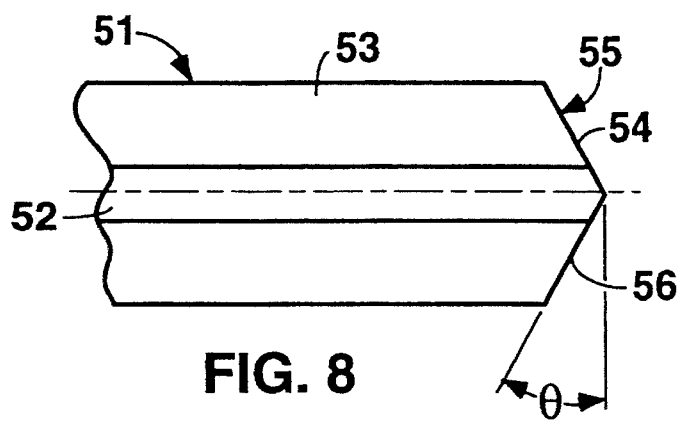
FIG. 8 is a schematic illustration of a further embodiment.
Figure 9:
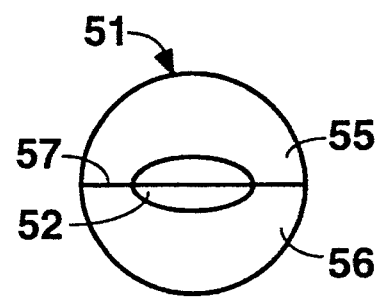
FIG. 9 is an end view of the lens of FIG. 8.

The anamorphic lens design illustrated in FIGS. 8 and 9 is easier to fabricate than the above described multiple angle lenses and has a coupling efficiency that can be larger than the efficiency of those lenses. This design consists of an optical fiber 51 having a cladding 53 and a core 52, the cross-section of the core in a plane perpendicular to the longitudinal fiber axis is an ellipse having a major and a minor axis. The end of the fiber is ground to form a wedge shaped microlens 54 that includes a surfaces 55 and 56 that intersect at a line 57 that lies on the major axis of the ellipse, i.e. line 57 substantially bisects the fiber core.

The calculated coupling efficiency for a 25° wedge on an elliptical core fiber having a 2.14×1.59 μm mode field is 93.5% (excluding coupling loss). The elliptical core single wedge lens design has a better coupling efficiency than a single wedge lens on a 2.0 μm circular mode field fiber, the coupling efficiency of which is 89.2% (excluding coupling loss). The coupling efficiency of the single wedge-elliptical core fiber could be increased even more by choosing a fiber having a mode field of higher ellipticity.

Figure 10:
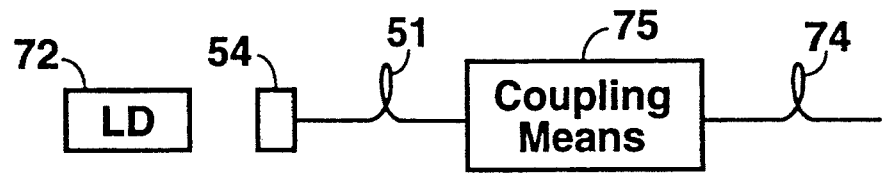
FIG. 10 is a schematic illustration of a system employing the lensed fiber of FIGS. 8 and 9.

FIG. 10 schematically illustrates a system for coupling light from laser diode 72 to circularly symmetric single-mode field fiber 74. Source 72 emits a beam of light having an elliptical cross-section, the cross-section of the beam in a plane perpendicular to the beam axis being an ellipse having a major and a minor axis. The elliptical mode fiber (and thus the wedge-shaped microlens) is oriented with respect to the source such that light from source 72 is efficiently coupled to elliptical core fiber 51. Light propagating in elliptical mode fiber 73 can be efficiently coupled to circularly symmetric single-mode fiber 74. For example, light from fiber 51 can be adiabatically transferred to fiber 74 by employing low loss coupling means 75 such as a fusion splice formed by multiple arcing or by using a 1×1 multiclad coupler such as that disclosed in the publication K. P. Jedrzejewski et al. "Tapered-Beam Expander for Single-Mode Optical Fiber Gap Devices", Electronics Letters, 16th Jan. 1986, vol. 22, No. 2, pp. 105–106.

Wedge shaped fiber lenses having two or more wedge angles could also be formed on elliptical mode fibers, but the difficulty in making the more complex lens would probably not justify the small increase in coupling efficiency.

We claim:

1. An optical fiber microlens comprising a single-mode optical fiber having a core and a cladding, a longitudinal fiber axis extending through said core, a wedge-shaped microlens on one end of said fiber, said microlens including a first pair of surfaces that intersect at a line that substantially bisects said fiber core, said microlens further including a second pair of surfaces that intersect said first pair of surfaces, the slopes of said first and second pairs of surfaces being θ and φ, wherein φ is greater than θ, the slopes of said first and second pairs of surfaces being measured with respect to a plane perpendicular to said longitudinal fiber axis.

2. A microlens in accordance with claim 1 wherein said second pair of surfaces intersect said first pair of surfaces at lines that intersect said core.

3. A microlens in accordance with claim 1 wherein the area of one of said first pair of surfaces is substantially equal to the area of the other of said first pair of surfaces.

4. A microlens in accordance with claim 1 wherein the radial extent of said second pair of surfaces is at least six mode field radii.

5. A microlens in accordance with claim 4 wherein said first and second pairs of surfaces constitute the entire endface of said fiber.

6. An optical fiber microlens comprising a single-mode optical fiber having a core and a cladding, a longitudinal fiber axis extending through said core, a quasi cone-shaped microlens on one end of said fiber, said microlens exhibiting a first cone angle $\theta_1$ in a first plane through said axis, and a second cone angle $\theta_2$ in a second plane through said axis and perpendicular to said first plane, said cone angles being measured with respect to a plane passing through the end of said lens and perpendicular to said axis, that portion of said lens at which said cone angle is $\theta_1$ being located at an azimuthal angle ρ=0°, said cone angle changing monotonically from $\theta_1$ to $\theta_2$ as said azimuthal angle ρ changes from 0° to 90°, said cone angle changing monotonically from $\theta_2$ to $\theta_1$ as the azimuthal angle ρ is changed from 90° to 180°, the cross-section of said lens being symmetrical with respect to said axis as viewed in any plane passing through said axis.

7. A microlens in accordance with claim 6 wherein said cone angle changes linearly from $\theta_1$ to $\theta_2$ as said azimuthal angle ρ changes from 0° to 90°, and said cone angle changes linearly from $\theta_2$ to $\theta_1$ as the azimuthal angle ρ changes from 90° to 180°.

8. An optical fiber microlens comprising an optical fiber having a core and a cladding, a longitudinal fiber axis extending through said core, the cross-section of said core in a plane perpendicular to said axis being an ellipse having a major and a minor axis, a wedge-shaped microlens on one end of said fiber, said microlens including a first pair of surfaces that intersect at a line that substantially bisects said fiber core and lies on said major axis.

9. A coupling element for coupling a radiation source to a circularly symmetric single-mode optical fiber, said source emitting a beam of light having an elliptical cross-section, the cross-section of said beam in a plane perpendicular to the axis of said beam being an ellipse having a major and a minor axis, an elliptical mode fiber having a core and a cladding, the cross-section of said core in a plane perpendicular to the longitudinal axis of said fiber being an ellipse having a major and a minor axis, a wedge-shaped microlens on one end of said elliptical mode fiber, said microlens including a pair of surfaces that intersect at a line that substantially bisects said fiber core and lies on the major axis of said fiber core, said elliptical mode fiber being oriented with respect to said source such that the major axis of said fiber core is aligned with the major axis of said beam, and means for coupling a signal propagating in said elliptical mode fiber to said circularly symmetric fiber.

* * * * *